United States Patent
McFarland

(10) Patent No.: US 9,326,143 B2
(45) Date of Patent: *Apr. 26, 2016

(54) AUTHENTICATION VIA MOTION OF WIRELESS DEVICE MOVEMENT

(71) Applicant: TeleCommunication Systems, Inc., Annapolis, MD (US)

(72) Inventor: Keith A. McFarland, Annapolis, MD (US)

(73) Assignee: TeleCommunication Systems, Inc., Annapolis, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/617,359

(22) Filed: Feb. 9, 2015

(65) Prior Publication Data

US 2015/0181426 A1 Jun. 25, 2015

Related U.S. Application Data

(63) Continuation of application No. 13/716,786, filed on Dec. 17, 2012, now Pat. No. 8,984,591.

(60) Provisional application No. 61/576,755, filed on Dec. 16, 2011.

(51) Int. Cl.
*G06F 15/16* (2006.01)
*H04W 12/06* (2009.01)
(Continued)

(52) U.S. Cl.
CPC .............. *H04W 12/06* (2013.01); *H04W 12/08* (2013.01); *H04W 4/027* (2013.01)

(58) Field of Classification Search
USPC ........................................................ 726/4, 28
See application file for complete search history.

(56) References Cited

U.S. PATENT DOCUMENTS

| 1,103,073 A | 7/1914 | O'Connell |
| 4,445,118 A | 4/1984 | Taylor et al. |

(Continued)

FOREIGN PATENT DOCUMENTS

| EP | WO2010/124739 | 11/2010 |
| KR | WO/2006/075856 | 7/2006 |

(Continued)

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

(Continued)

*Primary Examiner* — Amare F Tabor
(74) *Attorney, Agent, or Firm* — Watson Intellectual Property Group, PLC; Dan Fiul

(57) ABSTRACT

Motion of a wireless device is pre-registered as authentication credentials, then later matched, to provide motion-based authentication for access to software, service, etc. The wireless device may contain any number of gyroscopic, distance, positional or compass sensors—any or all of which are measured during a physical gesture or motion or the wireless device while the user is holding the wireless device. Recorded measurements of the specific motion then identifies the authorized user. If measurements of an attempted motion suitably matches the pre-registered and valid authentication credentials for the service or device, then the motioned wireless device is authenticated for use by the user. Such motion is difficult, if not impossible, for a user to pass on to another individual—even if they wanted to, making it the ultimate security technique.

14 Claims, 4 Drawing Sheets

(51) Int. Cl.
*H04W 12/08* (2009.01)
*H04W 4/02* (2009.01)

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Scheffer |
| 4,910,767 A | 3/1990 | Brugliera et al. |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Scheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Scheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Caroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,432,841 A | 7/1995 | Rimer |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossman |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khuc |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seaholtz |
| 5,922,074 A | 7/1999 | Richard |
| 5,930,250 A | 7/1999 | Klok |
| 5,930,701 A | 7/1999 | Skog |
| 5,943,399 A | 8/1999 | Banister |
| 5,945,944 A | 8/1999 | Krasner |
| 5,946,629 A | 8/1999 | Sawyer |
| 5,946,630 A | 8/1999 | Willars |
| 5,950,130 A | 9/1999 | Coursey |
| 5,950,137 A | 9/1999 | Kim |

(56) References Cited

U.S. PATENT DOCUMENTS

| | | |
|---|---|---|
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Houtari |
| 5,998,111 A | 12/1999 | Abe |
| 5,999,124 A | 12/1999 | Sheynblat |
| 6,014,602 A | 1/2000 | Kithol |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabush |
| 6,104,931 A | 8/2000 | Havinis |
| 6,108,533 A | 8/2000 | Brohoff |
| 6,122,503 A | 9/2000 | Daly |
| 6,122,520 A | 9/2000 | Want |
| 6,124,810 A | 9/2000 | Segal |
| 6,131,028 A | 10/2000 | Whittington |
| 6,131,067 A | 10/2000 | Girerd |
| 6,133,874 A | 10/2000 | Krasner |
| 6,134,483 A | 10/2000 | Vayanos |
| 6,138,003 A | 10/2000 | Kingdon |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,188,354 B1 | 2/2001 | Soliman |
| 6,188,752 B1 | 2/2001 | Lesley |
| 6,188,909 B1 | 2/2001 | Alananra |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feauque |
| 6,249,680 B1 | 6/2001 | Wax |
| 6,249,744 B1 | 6/2001 | Morita |
| 6,249,873 B1 | 6/2001 | Richard |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotala |
| 6,324,542 B1 | 11/2001 | Wright, Jr. et al. |
| 6,327,473 B1 | 12/2001 | Soliman |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchinson, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko |
| 6,556,832 B1 | 4/2003 | Soliman |
| 6,560,456 B1 | 5/2003 | Lohtia |
| 6,560,461 B1 | 5/2003 | Fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |

(56) References Cited

U.S. PATENT DOCUMENTS

| | | |
|---|---|---|
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockheart |
| 6,680,695 B2 | 1/2004 | Turetzky |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,757,545 B2 | 6/2004 | Nowak |
| 6,757,828 B1 | 6/2004 | Jaffe |
| 6,771,742 B2 | 8/2004 | McCalmont |
| 6,771,971 B2 | 8/2004 | Smith |
| 6,772,340 B1 | 8/2004 | Peinado |
| 6,775,255 B1 | 8/2004 | Roy |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,264 B2 | 11/2004 | Vassilovski |
| 6,813,560 B2 | 11/2004 | Van Diggelen |
| 6,816,111 B2 | 11/2004 | Krasner |
| 6,816,580 B2 | 11/2004 | Timmins |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Kogan |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B2 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson et al. |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,110,773 B1 | 9/2006 | Wallace |
| 7,136,466 B1 | 11/2006 | Gao |
| 7,136,838 B1 | 11/2006 | Peinado |
| 7,151,946 B2 | 12/2006 | Maggenti |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,200,380 B2 | 4/2007 | Havlark |
| 7,209,758 B1 | 4/2007 | Moll et al. |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,260,186 B2 | 8/2007 | Zhu |
| 7,260,384 B2 | 8/2007 | Bales et al. |

(56) References Cited

U.S. PATENT DOCUMENTS

| | | |
|---|---|---|
| 7,321,773 B2 | 1/2008 | Hines |
| 7,330,899 B2 | 2/2008 | Wong |
| 7,333,480 B1 | 2/2008 | Clarke |
| 7,369,508 B2 | 5/2008 | Parantainen |
| 7,369,530 B2 | 5/2008 | Keagy |
| 7,382,773 B2 | 6/2008 | Schoeneberger |
| 7,394,896 B2 | 7/2008 | Norton |
| 7,428,571 B2 | 9/2008 | Ichimura |
| 7,436,785 B1 | 10/2008 | McMullen |
| 7,440,442 B2 | 10/2008 | Grabelsky et al. |
| 7,573,982 B2 | 8/2009 | Breen |
| 7,602,886 B1 | 10/2009 | Beech |
| 7,711,094 B1 | 5/2010 | Olshansky |
| 7,783,297 B2 | 8/2010 | Ishii |
| 2001/0011247 A1 | 8/2001 | O'Flaherty |
| 2001/0040886 A1 | 11/2001 | Jimenez |
| 2001/0047488 A1* | 11/2001 | Verplaetse ............... G06F 21/32 726/5 |
| 2001/0049274 A1 | 12/2001 | Degraeve |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0086676 A1 | 7/2002 | Hendry |
| 2002/0098832 A1 | 7/2002 | Fleischer |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 | 8/2002 | Jagadeesan |
| 2002/0123327 A1 | 9/2002 | Vataja |
| 2002/0126656 A1 | 9/2002 | Park |
| 2002/0138650 A1 | 9/2002 | Yamamoto |
| 2002/0156732 A1 | 10/2002 | Odjik |
| 2002/0158777 A1 | 10/2002 | Flick |
| 2002/0173317 A1 | 11/2002 | Nykanen |
| 2002/0191595 A1 | 12/2002 | Mar |
| 2003/0009277 A1 | 1/2003 | Fan |
| 2003/0009602 A1 | 1/2003 | Jacobs |
| 2003/0012148 A1 | 1/2003 | Peters |
| 2003/0013449 A1 | 1/2003 | Hose |
| 2003/0016804 A1 | 1/2003 | Sheha |
| 2003/0026245 A1 | 2/2003 | Ejzak |
| 2003/0037163 A1 | 2/2003 | Kitada |
| 2003/0040272 A1 | 2/2003 | Lelievre |
| 2003/0065788 A1 | 4/2003 | Salomaki |
| 2003/0072318 A1 | 4/2003 | Lam |
| 2003/0078064 A1 | 4/2003 | Chan |
| 2003/0081557 A1 | 5/2003 | Mettala |
| 2003/0086422 A1 | 5/2003 | Klinker et al. |
| 2003/0096626 A1 | 5/2003 | Sabo et al. |
| 2003/0100320 A1 | 5/2003 | Ranjan |
| 2003/0101329 A1 | 5/2003 | Lahti |
| 2003/0101341 A1 | 5/2003 | Kettler |
| 2003/0103484 A1 | 6/2003 | Oommen |
| 2003/0108176 A1 | 6/2003 | Kung |
| 2003/0109245 A1 | 6/2003 | McCalmont |
| 2003/0114157 A1 | 6/2003 | Spitz |
| 2003/0119521 A1 | 6/2003 | Tipnis |
| 2003/0119528 A1 | 6/2003 | Pew |
| 2003/0125042 A1 | 7/2003 | Olrik |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0196105 A1 | 10/2003 | Fineburg |
| 2003/0204640 A1 | 10/2003 | Sahineja |
| 2003/0223381 A1 | 12/2003 | Schroderus |
| 2004/0002326 A1 | 1/2004 | Maher |
| 2004/0032485 A1 | 2/2004 | Stephens |
| 2004/0043775 A1 | 3/2004 | Kennedy |
| 2004/0044623 A1 | 3/2004 | Wake |
| 2004/0047461 A1 | 3/2004 | Weisman |
| 2004/0068724 A1 | 4/2004 | Gardner |
| 2004/0092250 A1 | 5/2004 | Valloppillil |
| 2004/0098497 A1 | 5/2004 | Banet |
| 2004/0132465 A1 | 7/2004 | Mattila |
| 2004/0148357 A1 | 7/2004 | Corrigan et al. |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Knox |
| 2004/0198332 A1 | 10/2004 | Lundsgaard |
| 2004/0198386 A1 | 10/2004 | Dupray |
| 2004/0203922 A1 | 10/2004 | Hines |
| 2004/0205151 A1 | 10/2004 | Sprigg |
| 2004/0229632 A1 | 11/2004 | Flynn |
| 2004/0235493 A1 | 11/2004 | Ekerborn |
| 2004/0242238 A1 | 12/2004 | Wang |
| 2004/0267445 A1 | 12/2004 | De Luca |
| 2005/0005132 A1* | 1/2005 | Yantzi ..................... G06F 21/31 713/184 |
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0053209 A1 | 3/2005 | D'Evelyn |
| 2005/0071671 A1 | 3/2005 | Karaoguz |
| 2005/0083911 A1 | 4/2005 | Grabelsky |
| 2005/0086467 A1 | 4/2005 | Asokan |
| 2005/0090236 A1 | 4/2005 | Schwinke |
| 2005/0107673 A1 | 5/2005 | Ball |
| 2005/0112030 A1 | 5/2005 | Gaus |
| 2005/0119012 A1 | 6/2005 | Merheb |
| 2005/0132200 A1 | 6/2005 | Jaffe |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0149430 A1 | 7/2005 | Williams |
| 2005/0169248 A1 | 8/2005 | Truesdale |
| 2005/0174991 A1 | 8/2005 | Keagy |
| 2005/0192822 A1 | 9/2005 | Hartenstein |
| 2005/0201529 A1 | 9/2005 | Nelson |
| 2005/0209995 A1 | 9/2005 | Aksu |
| 2005/0213716 A1 | 9/2005 | Zhu |
| 2005/0232252 A1 | 10/2005 | Hoover |
| 2005/0243778 A1 | 11/2005 | Wang |
| 2005/0250516 A1 | 11/2005 | Shim |
| 2005/0259675 A1 | 11/2005 | Tuohino |
| 2005/0265318 A1 | 12/2005 | Khartabil |
| 2005/0266864 A1 | 12/2005 | Chen et al. |
| 2005/0271029 A1 | 12/2005 | Iffland |
| 2005/0282518 A1 | 12/2005 | D'Evelyn |
| 2005/0287979 A1 | 12/2005 | Rollender |
| 2005/0287990 A1 | 12/2005 | Mononen |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0036680 A1 | 2/2006 | Shim |
| 2006/0053225 A1 | 3/2006 | Poikselka |
| 2006/0058042 A1 | 3/2006 | Shim |
| 2006/0058102 A1 | 3/2006 | Nguyen et al. |
| 2006/0064307 A1 | 3/2006 | Pakkala |
| 2006/0068753 A1 | 3/2006 | Karpen |
| 2006/0079249 A1 | 4/2006 | Shim |
| 2006/0120517 A1 | 6/2006 | Moon |
| 2006/0128395 A1 | 6/2006 | Muhonen |
| 2006/0135177 A1 | 6/2006 | Winterbottom |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0225090 A1 | 10/2006 | Shim et al. |
| 2006/0234639 A1 | 10/2006 | Kushwaha |
| 2006/0234698 A1 | 10/2006 | Fok |
| 2006/0239205 A1 | 10/2006 | Warren |
| 2006/0242230 A1 | 10/2006 | Smith |

(56) References Cited

U.S. PATENT DOCUMENTS

| | | | |
|---|---|---|---|
| 2006/0258380 A1 | 11/2006 | Liebowitz | |
| 2006/0284969 A1* | 12/2006 | Kim | G06F 21/316 348/14.01 |
| 2006/0293024 A1 | 12/2006 | Benco | |
| 2006/0293066 A1 | 12/2006 | Edge | |
| 2007/0003024 A1 | 1/2007 | Olivier | |
| 2007/0019614 A1 | 1/2007 | Hoffmann | |
| 2007/0022011 A1 | 1/2007 | Altberg | |
| 2007/0026854 A1 | 2/2007 | Nath | |
| 2007/0026871 A1 | 2/2007 | Wager | |
| 2007/0027997 A1 | 2/2007 | Polk | |
| 2007/0030539 A1 | 2/2007 | Nath | |
| 2007/0036139 A1 | 2/2007 | Patel | |
| 2007/0037585 A1 | 2/2007 | Shim | |
| 2007/0041513 A1 | 2/2007 | Gende | |
| 2007/0049288 A1 | 3/2007 | Lamprecht | |
| 2007/0072624 A1 | 3/2007 | Niemaenmaa | |
| 2007/0081635 A1 | 4/2007 | Croak | |
| 2007/0082681 A1 | 4/2007 | Kim | |
| 2007/0082682 A1 | 4/2007 | Kim | |
| 2007/0115941 A1 | 5/2007 | Patel | |
| 2007/0121601 A1 | 5/2007 | Kikinis | |
| 2007/0149213 A1 | 6/2007 | Lamba | |
| 2007/0160036 A1 | 7/2007 | Smith | |
| 2007/0162228 A1 | 7/2007 | Mitchell | |
| 2007/0167177 A1 | 7/2007 | Kraufvelin | |
| 2007/0182547 A1 | 8/2007 | Wachter | |
| 2007/0202897 A1 | 8/2007 | Smith | |
| 2007/0206568 A1 | 9/2007 | Silver | |
| 2007/0206613 A1 | 9/2007 | Silver | |
| 2007/0242660 A1 | 10/2007 | Xu | |
| 2007/0243885 A1 | 10/2007 | Shim | |
| 2007/0263610 A1 | 11/2007 | Mitchell | |
| 2007/0270164 A1 | 11/2007 | Maier | |
| 2008/0014931 A1 | 1/2008 | Yared | |
| 2008/0020733 A1* | 1/2008 | Wassingbo | G06F 3/017 455/411 |
| 2008/0037715 A1 | 2/2008 | Prozeniuk | |
| 2008/0063153 A1 | 3/2008 | Krivorot | |
| 2008/0065775 A1 | 3/2008 | Polk | |
| 2008/0109650 A1 | 5/2008 | Shim | |
| 2008/0117859 A1 | 5/2008 | Shahidi | |
| 2008/0186164 A1 | 8/2008 | Emigh | |
| 2008/0214202 A1 | 9/2008 | Toomey | |
| 2008/0263169 A1 | 10/2008 | Brabec et al. | |
| 2009/0137244 A1 | 5/2009 | Zhou et al. | |
| 2009/0158136 A1 | 6/2009 | Rossano et al. | |
| 2009/0158397 A1 | 6/2009 | Herzog et al. | |
| 2009/0172804 A1 | 7/2009 | Spies et al. | |
| 2009/0265552 A1 | 10/2009 | Moshir et al. | |
| 2009/0265763 A1 | 10/2009 | Davies et al. | |
| 2009/0320123 A1 | 12/2009 | Yu | |
| 2010/0311447 A1 | 12/2010 | Jackson | |
| 2011/0053618 A1 | 3/2011 | Lin et al. | |
| 2011/0145564 A1 | 6/2011 | Moshir et al. | |
| 2011/0252146 A1 | 10/2011 | Santamaria et al. | |
| 2011/0300830 A1 | 12/2011 | Ramrattan | |
| 2011/0307947 A1 | 12/2011 | Kariv | |
| 2012/0150968 A1 | 6/2012 | Yasrebi et al. | |
| 2012/0192287 A1 | 7/2012 | Cai et al. | |
| 2013/0171971 A1 | 7/2013 | Fuji | |
| 2013/0191908 A1 | 7/2013 | Klein | |
| 2013/0202108 A1 | 8/2013 | Kao | |

FOREIGN PATENT DOCUMENTS

| | | |
|---|---|---|
| WO | PCT/SE98/01887 | 10/1998 |
| WO | PCTUS9928848 | 12/1999 |
| WO | WO01/45342 | 6/2001 |
| WO | PCTUS0146666 | 11/2001 |
| WO | WO2004/025941 | 3/2004 |
| WO | PCT/US2005/022090 | 6/2005 |
| WO | WO2005/051033 | 6/2005 |

OTHER PUBLICATIONS

International Search Report in PCT/US2007/23243 dated Apr. 2, 2008.
PCT International Search Report (PCTUS2007/23714) and Written Opinion of International Searching Authority, Apr. 18, 2008.
Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.
Location Based Services V2 Roaming Support (non proprietary), 80-V8470-2NP A, dated Jan. 27, 2005, pp. 1-56.
Qualcomm CDMA Technologies, MS Resident User Plane LBS Roaming—80-VC718-1 E, 2006, pp. 1-37.
Qualcomm CDMA Technologies, LBS Control Plane/User Plane Overview—80-VD378-1NP B, 2006, pp. 1-36.
Bhalla et al, TELUS, Technology Strategy—LBS Roaming Summit, Sep. 19, 2006.
Alfredo Aguirre, Ilusacell, First and Only Carrier in Mexico with a 3G CDMA Network, 2007.
Mike McMullen, Sprint, LBS Roaming Summit, Sep. 19, 2006.
Andrew Yeow, BCE, LBS Roaming Summit, Sep. 19, 2006, pp. 1-8.
Nars Haran, U.S. Cellular, Packet Data—Roaming and LBS Overview, Nov. 2, 2007, pp. 1-15.
Qualcomm CDMA Technologies, LBS Control Plane Roaming—80-VD377-1NP A, 2006, pp. 1-10.
International Search Report received in PCT/US2013/21199 dated Mar. 26, 2013.
International Search Report received in PCT/US2012/068083 dated Feb. 8, 2013.

* cited by examiner

AUTHENTICATION VIA MOTION OF WIRELESS DEVICE MOVEMENT

The present application is a continuation of U.S. application Ser. No. 13/716,786, entitled "Authentication Via Motion of Wireless Device Movement" to McFarland, filed Dec. 17, 2012; which claims priority from U.S. Provisional No. 61/576,755, entitled "Authentication Via Wireless Device Movement" to McFarland, filed Dec. 16, 2011, the entirety of both of which is are expressly incorporated herein by reference.

BACKGROUND OF THE INVENTION

1. Field of the Invention

This invention relates generally to telecommunications. More particularly, it relates to computer/electronic security specifically as it relates to authentication and authorization.

2. Background of the Related Art

The existing technology for electronic authentication relies heavily upon two types of authentication methods: (1) use of a keyboard or reactive touch screen to input a PIN, username, password, etc.; and/or (2) use of a keyboard or reactive touch screen to input a sequence of keypresses or pattern.

Another conventional type of authorization input is biometric, e.g., voice authentication using voice recognition software; retina scanner; etc. But the present inventor has appreciated that conventional technology, in the end, generally utilizes a sequence of a limited number of defined alphanumeric characters, and that there is a practical limit to the length of the required input sequence because it typically requires memorization by the user to provide as input for authentication. Reliance for authentication based on such existing technologies allows for some amount of risk in large part because the access credential may be passed on to an unauthorized user, thus increasing the likelihood of compromise.

SUMMARY OF THE INVENTION

In accordance with the principles of the present invention, a method of authenticating access to a wireless device to a restricted service comprises receiving a motion measurement of a motion parameter from a given wireless device attempting access to a restricted service. The motion measurement is compared to a pre-registered motion measurement. The given wireless device is authorized to access the restricted service when the motion measurement suitably matches the pre-registered motion measurement.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides an alternative means of authentication to the traditional mechanisms such as username/password, PIN or biometric options such as voice. These traditional means for authentication may be impractical based upon the situation. If the user is in a noisy location they may be unable to authenticate via biometric mechanism for voice. In other situations, the electronic devices used to provide username/password are impractical such as inadequate input mechanisms or maybe the user is wearing gloves and does not want to remove their gloves.

Secondly, besides the practicality of the provision of access credentials, existing technology utilizes access credentials which can very easily be disseminated or compromised. A passphrase, username, PIN, etc. are all very specifically recognized and explained when seen or heard. A more difficult means of access credentials is desired. Such a new method of access credentials is preferably more difficult to explain, and even if seen should be harder to reproduce.

Figure 1:
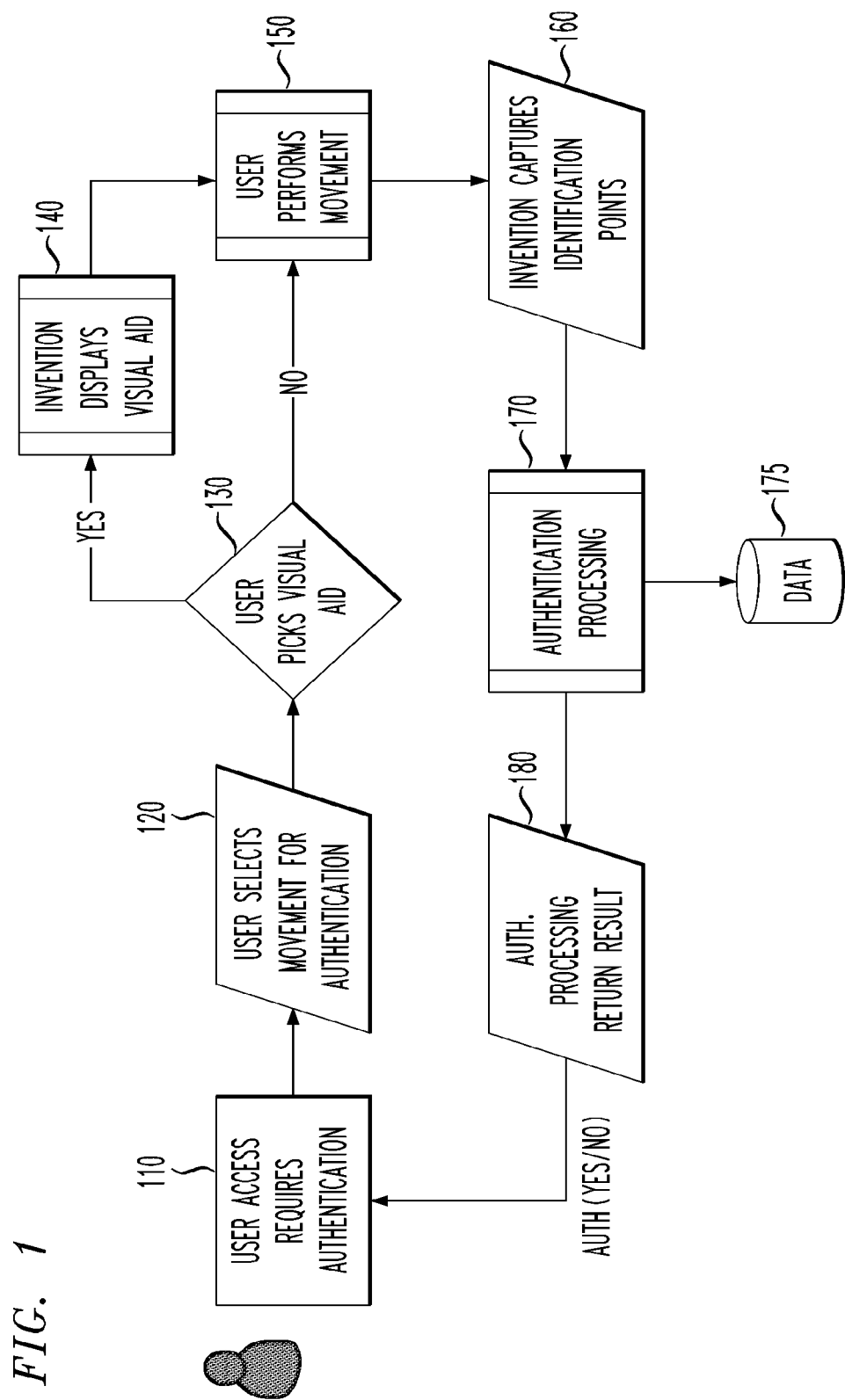
FIG. 1 shows motion-based authentication via wireless device motion, in accordance with the principles of the present invention.

FIG. 1 shows motion-based authentication via wireless device motion, in accordance with the principles of the present invention.

In particular, as shown in FIG. 1, the invention provides a mechanism for motion-based authentication via predefinition, then later measurement, of intentional motion of a given computing device.

In step 110 of FIG. 1, a user of a wireless device requires authentication to access a given software, service, etc.

In step 120, a user selects a given motion to be used as authentication and authorization input to an authenticating entity.

In step 130, a user may select a visual aid to assist them in presenting the physical motion as input. For instance, a visual aid may be a 3-dimensional path of a current motion drawn on a display of the wireless device.

In step 140, if a user desires use of the visual aid, it is displayed on the wireless device.

In any event, the process moves toward step 150, at which point the wireless device is physically passed through the attempted authenticating motion.

In step 160, measurement points along the attempted authenticating motion are taken by the wireless device itself and presented to the authenticating entity.

In step 170, the authenticating entity receives the measurement points of the attempted authenticating motion, and compares them against an measurements of an expected motion as maintained in an appropriate database 175.

In step 180, the authenticating entity processes and returns a result of the match attempt: authorized or not authorized, to the wireless device attempting access to the restricted service, device, location, etc.

Using motion-based authentication in accordance with the invention provides a better method for authenticating a wireless device, and its user.

The specific intentional motion of a given wireless device may be monitored by device sensors within the wireless device itself (e.g., accelerometer, GPS, etc.), and measured to define a given intentional motion of the wireless device to present a motion-based authentication credential as input to the authorizing agent.

The present application provides a new method and technique for defining and inputting authentication credentials to first pre-define, then later match, authorization credentials necessary to gain permission or authority to use a given device or service.

In accordance with the invention, subsequent actions post authentication enable a given wireless device (e.g., a wireless phone) authority to access to given computing devices, software, computing services, and/or access to physically restrictive spaces, etc. In accordance with the principles of the present invention, the given wireless device includes at least one movement and directional sensor capable of measuring a 3-dimensional motion of the given wireless device.

The invention utilizes computing device movement as a means for providing authentication credentials. The computing device may contain any number of gyroscopic, distance, positional or compass sensors—any of which may be implemented to record a specific movement which identifies the authorized user. If the measured movement suitably matches the pre-registered and valid authentication credentials for the service or device, then the motioned device is authenticated by the service for use. Subsequently, the user can then be granted access to the requested service, device location, etc.

Motion-based authentication in accordance with the invention may be implemented as the sole authentication technique. Alternatively, the motion-based authentication may be implemented in concert, or secondary/primary, with other authentication techniques (e.g., password, PIN, etc.) providing a multi-factor authentication.

Defined motion for authentication of the relevant wireless device may encompass any movement-based sensor techniques which specifically measure how the wireless device is moved.

Motion of a wireless device as referred to herein relates generally to motion while the user holding the wireless phone stays in-place, though some travel of the user while holding the wireless device being authenticated for use is within the principles of the present invention. For instance, the wireless phone may be motioned to form what visually would resemble a rectangular shape of, e.g., 8 foot wide and 6 feet high, which would require some small amount of travel of the user holding the wireless device. More likely though is a user motioning their wireless-device into a "figure eight" shape, perhaps with a flick of the wrist at a particular point along the shape to add uniqueness to the authenticating motion.

Motion-based authentication of a wireless device in accordance with the principles of the present invention may measure the total range of movement of the motioned wireless device. And/or authentication of the wireless device, as preferably directed by the authorized user of the wireless device, may record specific points (identification points) within the motion as the measurement input to indicate the appropriate access credentials.

Any number or combinations of motion measurements (identification points) may be combined as the total authentication credentials. Moreover, specific timing between reaching those motion measurements (identification points) may also be recorded. For instance, motioning a wireless device into a "figure eight" shape three times within 5 seconds, pre-defined to be the proper authentication credential for a given wireless device to authorized use.

Specific motion measurements may include, e.g., gyroscopic measurements—Yaw, Pitch, Roll; the height of travel relative to a starting point of the authentication motion; a distance from a given fixed object; motion in a direction as measured against a compass; and accelerometer measurements; to name a few. Also, a combination dial may be utilized.

To capture the motion, the motioned wireless device may preferably display visual tools to aid the user in capturing the motion along given identification points. The display may first be used in pre-defining the authenticating motion, then later assist the user in understanding the motion that they are currently making. The motion may be displayed to the user in any manner, e.g., as a 3-dimensional line through space.

Figure 2:
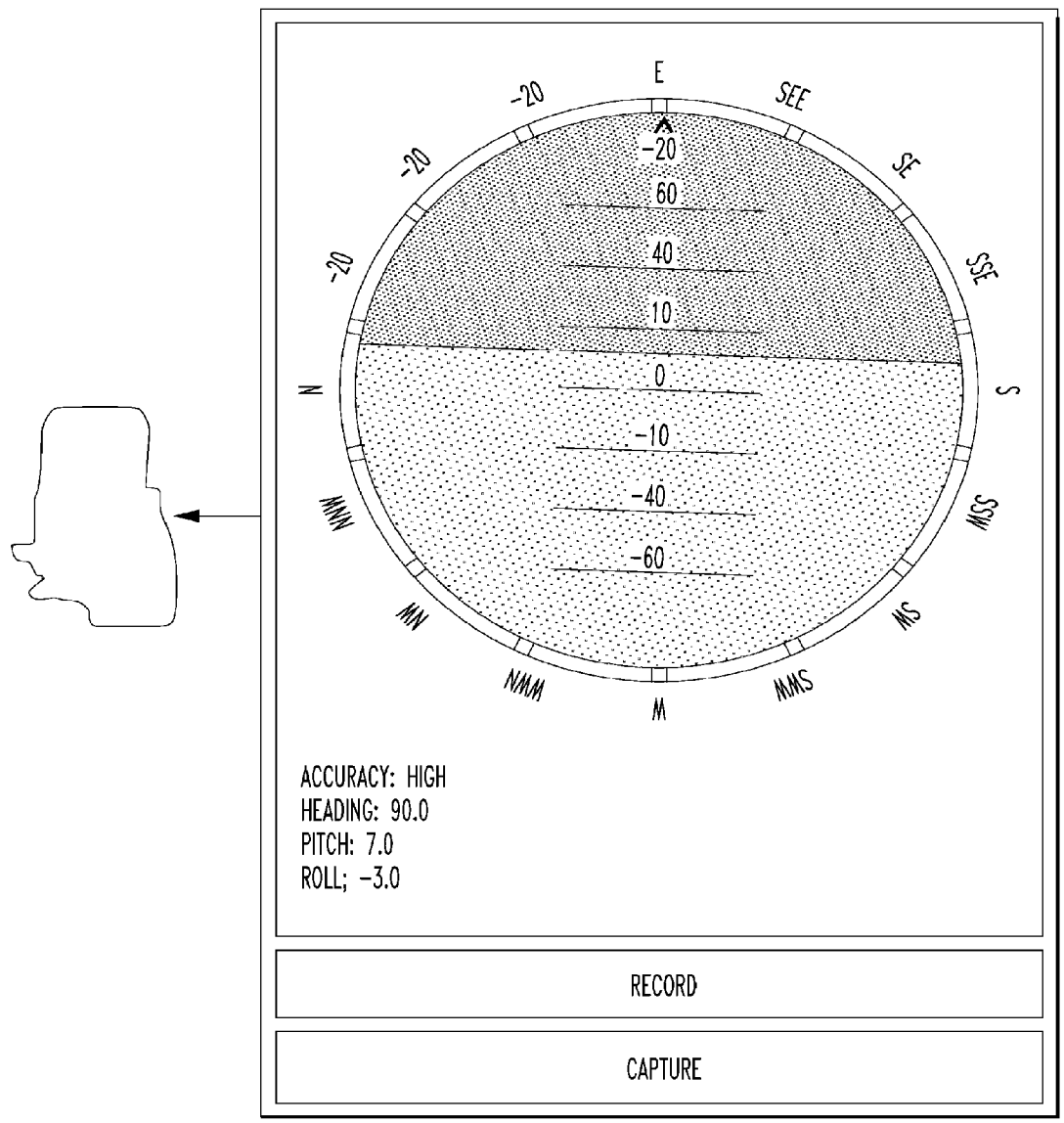
FIG. 2 shows an embodiment of motion-based authentication via wireless device motion using gyroscopic measurements, in accordance with the principles of the present invention.

FIG. 2 shows an embodiment of motion-based authentication via wireless device motion using gyroscopic measurements, in accordance with the principles of the present invention.

In particular, as depicted in FIG. 2, measurement of motion of the wireless device may be made via output from a gyroscope function within the wireless device, e.g., with heading, pitch and/or roll information.

Figure 3:
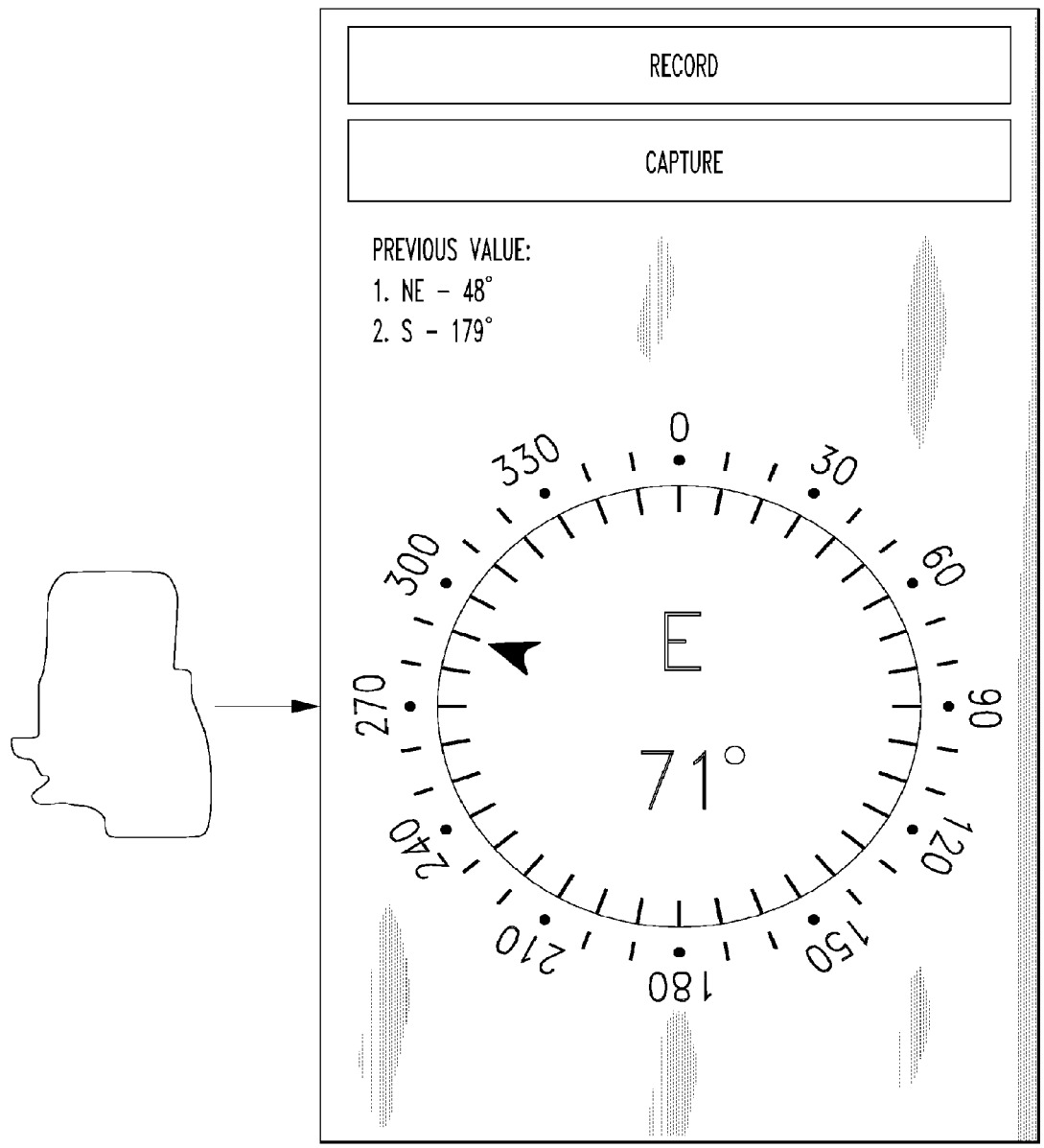
FIG. 3 shows another embodiment of motion-based authentication via wireless device motion using compass measurements, in accordance with the principles of the present invention.

FIG. 3 shows another embodiment of motion-based authentication via wireless device motion using compass measurements, in accordance with the principles of the present invention.

In particular, as shown in FIG. 3, another motion-sensitive functionality of a wireless device that may be utilized for motion-based authorization includes a compass reading.

Figure 4:
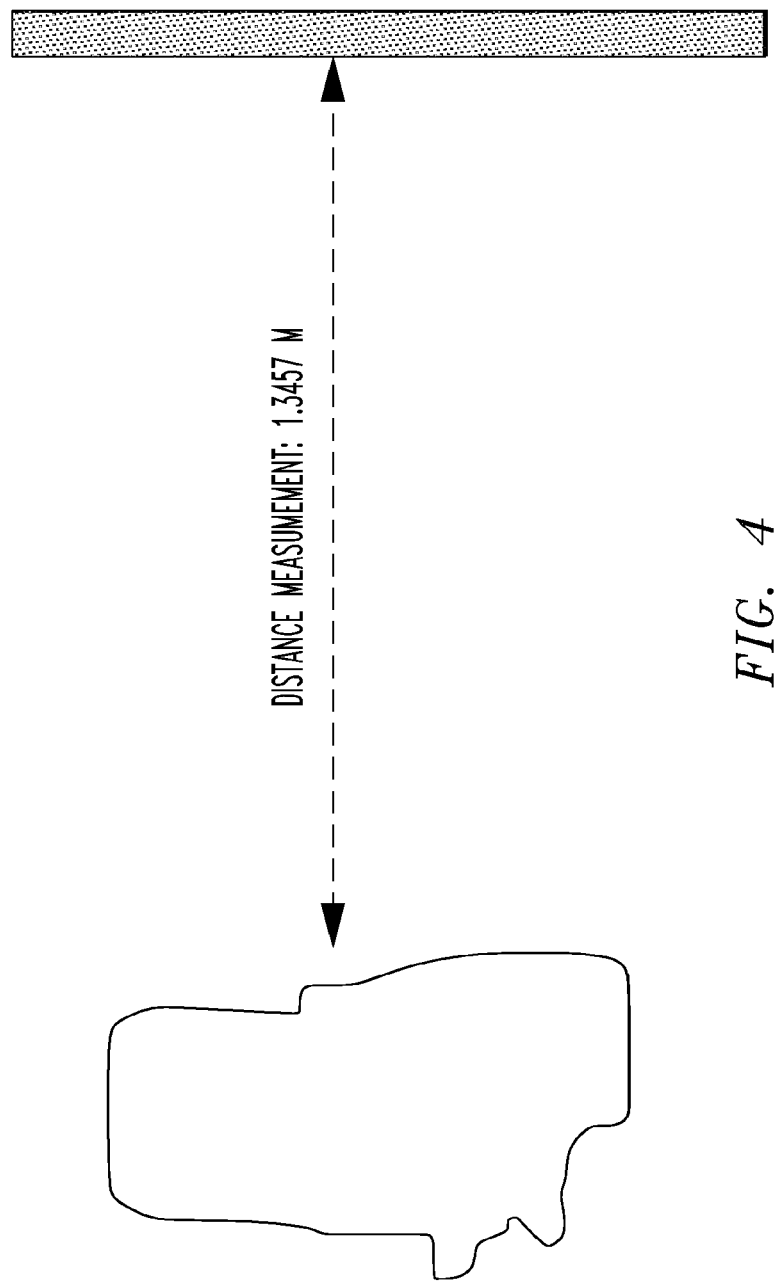
FIG. 4 shows yet another embodiment of motion-based authentication via wireless device motion using measurement of a distance motioned relative to a known position of a fixed object, in accordance with the principles of the present invention.

FIG. 4 shows yet another embodiment of motion-based authentication via wireless device motion using measurement of a distance motioned relative to a fixed object, in accordance with the principles of the present invention.

In particular, as shown in FIG. 4, the distance to an object, as measured by the wireless device, may be utilized as a sensed measurement to record a motion of the wireless device. The distance may be measured using a built-in distance measuring device. Alternatively the distance may be measured visually, e.g., using a camera and suitable software to estimate a distance to the photographed item (e.g., a wall).

The motion may be measured using an accelerometer on the wireless device, or combination dial (to a given setting while the motion takes place), or other motion sensor measurements to define physical motion of the wireless device through an entire range of motion.

Tighter security for authentication can be set with tighter matching requirements to pre-defined parameters for the authenticating motion. For instance, presume that an authenticating physical motion of the device passes the wireless device through a shape having a total 3-dimensional size of 32" wide, 30" high, 4" deep (if visualized in 3-dimensional space). Loose requirements might require the authenticating motion to match those dimensions to within 40%; whereas tight security might require reproduction of the same shaped motion to within say 5% of the pre-defined measurements (or less).

A motion-based authentication processing module utilizes configurable parameters (e.g., compass readings, accelerometer readings, directional readings, etc.) and compares the input motion measurements against those measurements of an authenticating motion which was pre-defined and pre-stored by the authorized user.

The beauty of the invention is that the particular shape of the motion need not be recognizable to the human eye. For instance, a user may shake their wireless device as fast as possible in a given direction, flick their wrist after the $6^{th}$ shake, shake a few more times, and pre-register that entire motion as being required for access to a given software, service, etc., (or even to gain access to a given physical location.) The resulting motion-sensor measurements, whatever they are to that given motion, is what is initially pre-stored, and then is matched against a repetition of the motion at a later time when authorization is desired.

Exemplary parameters for measurement of the motion of the wireless device used in the motion-based authentication process may include, e.g.:

Movement accuracy, rounding

Movement duration offset—variable allowed in movement through time and movement changes.

Timing and overall duration of movement.

The percentage of likeness for movement.

Quantity of identification points

Margin of offset per identification point.

The percentage of match and allowable offset is configurable.

A motion-based authorization processing module checks the authentication credentials, and returns a positive or negative authorization response to the requesting entity.

Motion-based authentication by physical motion of a given wireless device is exponentially more secure than otherwise traditional authentication techniques.

A motion-based authentication processing technique in accordance with the principles of the present invention can use a configurable number and/or type of motion-measurement points, e.g., measured into thousands upon thousands. These motion-defining points required for authorized access to a given software, service, etc., results in numerous variables including the physical nature of a given human being over another, making access via a brute force motion attack virtually impossible. The higher the number of required matches to pre-defined motion points, the stronger the authentication.

The infinite variety in possible motion of a given wireless device enables further flexibility in authentication methods. The capability to use motion-based authentication in accordance with the invention—either together with otherwise conventional authentication methods, by itself, or even by compounding a measured number and/or type of motion identification points—permits an appropriate user of a given wireless device the ability to customize their motion-based authentication in a way that is familiar to them yet ensures against compromise.

An additional feature of the present invention is that a user can input authorization information into a given requesting device even if they are wearing gloves (which must typically be removed to type or activate a touch-screen.) Moreover, an exact physical motion is difficult if not impossible for a user to pass on to another individual—even if they wanted to, essentially rendering the authorized user the only possible individual who will be able to access the restricted software, service, etc.

While the invention has been described with reference to the exemplary embodiments thereof, those skilled in the art will be able to make various modifications to the described embodiments of the invention without departing from the true spirit and scope of the invention.

What is claimed is:

1. A method of authenticating a wireless device, comprising:

receiving, at the wireless device, a series of motion measurements along each of a plurality of sequential identification points, the motion measurements along at least some of the plurality of sequential identification points including an orientation measurement of the wireless device; and authorizing the wireless device to access a restricted service when the series of motion measurements along each of the plurality of sequential identification points matches a pre-registered authentication credential associated with the wireless device.

2. The method of authenticating a wireless device according to claim 1, wherein the series of motion measurements along each of the plurality of sequential identification points includes a height of travel of the wireless device.

3. The method of authenticating a wireless device according to claim 1, wherein the series of motion measurements along each of the plurality of sequential identification points includes a distance of the wireless device to a reference object.

4. The method of authenticating a wireless device according to claim 3, wherein the reference object is a fixed object.

5. The method of authenticating a wireless device according to claim 4, wherein the fixed object is a wall.

6. The method of authenticating a wireless device according to claim 1, wherein the series of motion measurements along each of the plurality of sequential identification points includes a compass heading measurement.

7. The method of authenticating a wireless device according to claim 6, wherein the compass heading measurement is an average compass heading measurement.

8. The method of authenticating a wireless device according to claim 1, wherein the series of motion measurements along each of the plurality of sequential identification points includes an accelerometer measurement.

9. The method of authenticating a wireless device according to claim 8, wherein the accelerometer measurement is an average accelerometer measurement.

10. The method of authenticating a wireless device according to claim 1, further comprising prompting the wireless device for input of the pre-registered authentication credential.

11. The method of authenticating a wireless device according to claim 1, further comprising presenting to the wireless device a visual aid to assist in presenting a physical motion as input on the wireless device.

12. The method of authenticating a wireless device according to claim 1, further comprising pre-registering the authentication credential through physical motioning of the wireless device.

13. The method of authenticating a wireless device according to claim 1, wherein the orientation measurement of the wireless device includes at least one of a roll, pitch, and yaw measurement of the wireless device.

14. The method of authenticating a wireless device according to claim 1, wherein the restricted service includes at least one of a computing device, software, and computing services.

* * * * *